Figure 4:
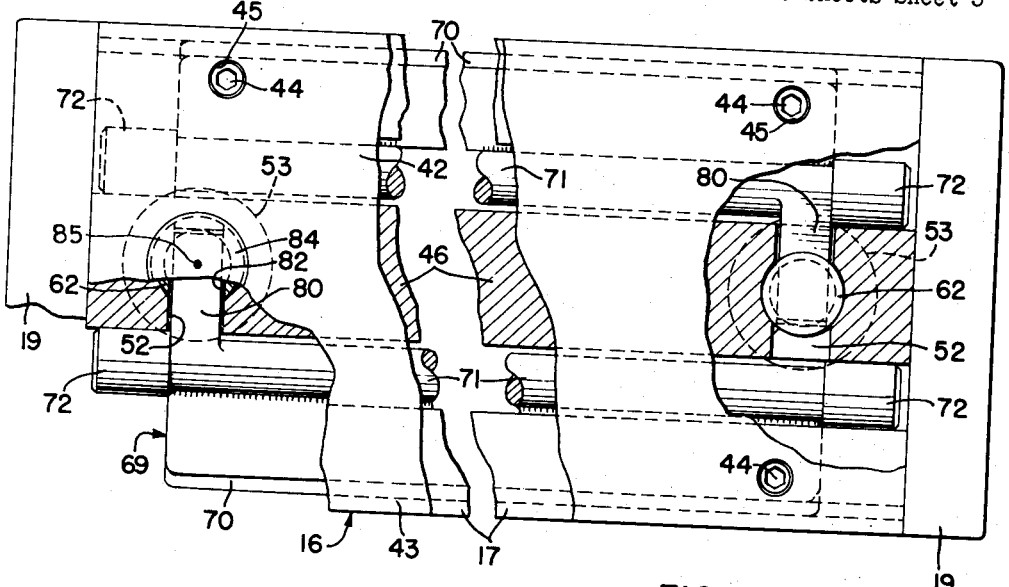

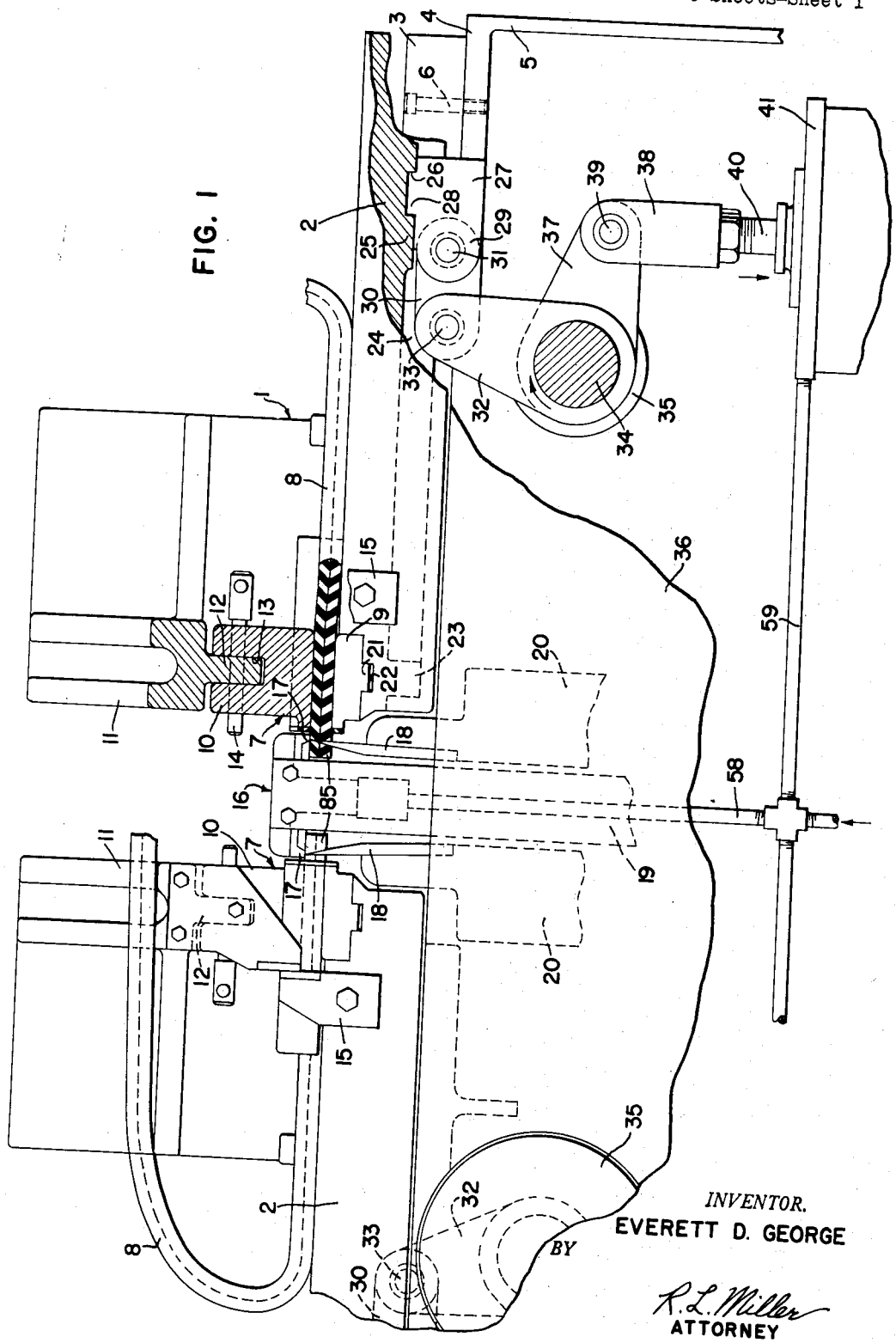

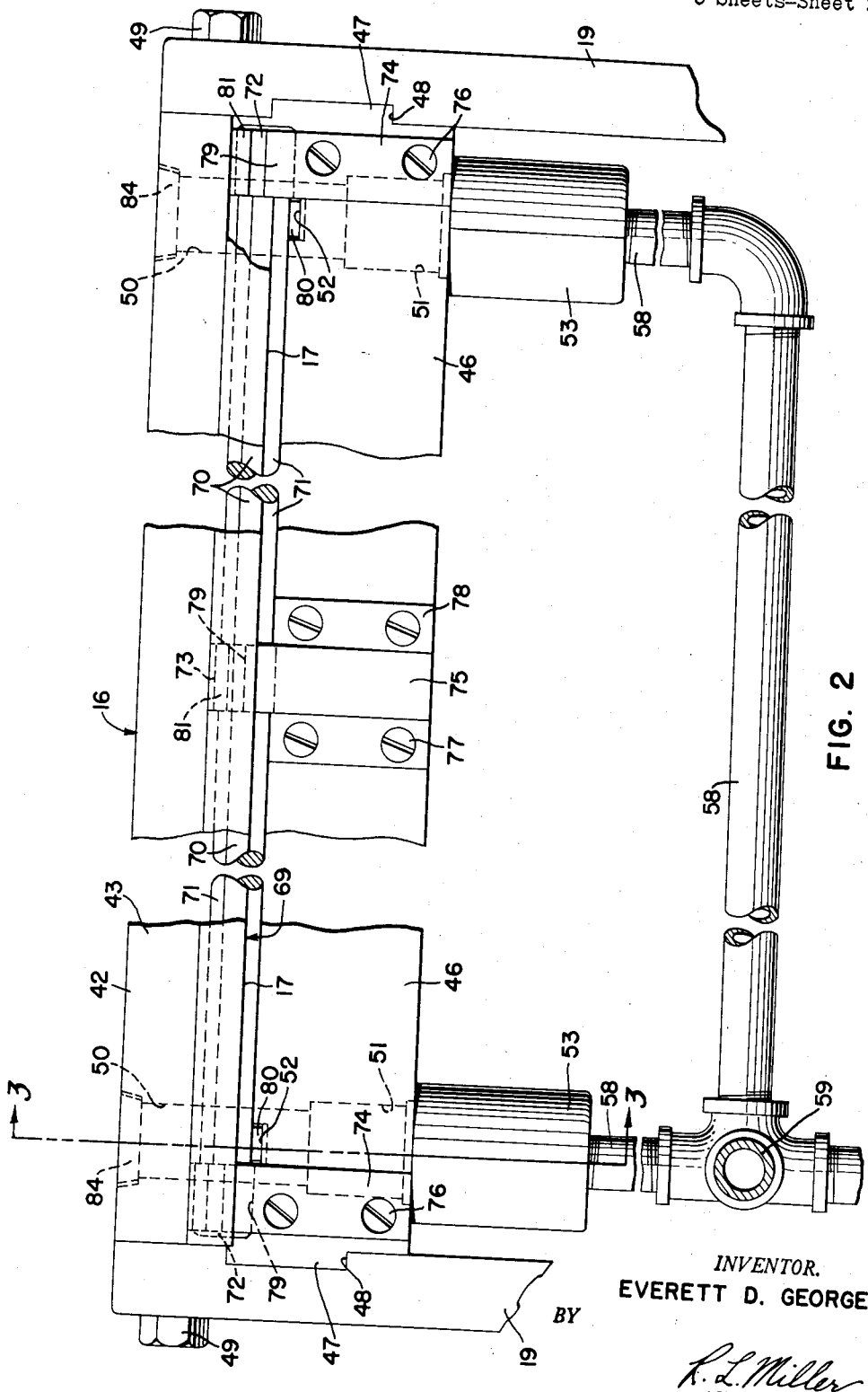

July 5, 1955  E. D. GEORGE  2,712,341
KNIFE CLEANING DEVICE FOR BUTT SPLICING APPARATUS
Filed Feb. 18, 1952  3 Sheets-Sheet 3

INVENTOR.
EVERETT D. GEORGE
BY
R. L. Miller
ATTORNEY

United States Patent Office 2,712,341
Patented July 5, 1955

2,712,341

KNIFE CLEANING DEVICE FOR BUTT SPLICING APPARATUS

Everett D. George, Cuyahoga Falls, Ohio, assignor, by mesne assignments, to The Goodyear Tire & Rubber Company, a corporation of Ohio Application February 18, 1952, Serial No. 272,080

10 Claims. (Cl. 154—9)

The present invention pertains to a form of knife cleaning device and the like for use in butt splicing apparatus employed in joining together the ends of rubber, plastic, and other similar material. More particularly, the invention is concerned with an attachment which is particularly advantageously adapted to be used in conjunction with butt splicing equipment of the type employed in splicing inner tubes for the removal of rubber particles which tend to accumulate on the heated cutting edges used for trimming the ends of the stock which are to be joined.

In the manufacture of inner tubes, a suitable rubber compound is extruded in the form of a tube of indeterminate length. This unvulcanized rubber tubular material or tube stock, as it is called, is then cut to predetermined lengths such that when the ends are joined, an endless, generally toroidically shaped fluid container of a predetermined dimension will be formed. The ends of each piece of tube stock are joined together by a butt splicing operation according to which a relatively small piece is trimmed off each of the ends of the material with a heated knife to render the stock tacky so that when the trimmed ends are mated and squeezed together, they will seal temporarily until the entire inner tube is vulcanized according to conventional practices.

When the tube stock is trimmed in the butt splicing apparatus, the excess stock which is removed by the heated knives has a tendency to adhere to the cutting edges thereof. This is detrimental for several reasons. The stock trimmings sticking to the cutting edge of the knife tend not only to cool the knife more quickly, but also to create an accumulation thereon in a short space of time. These factors necessitate a stepping up of the knife temperature to insure the proper degree of tackiness in the trimmed edges of the stock. Moreover, if the stock trimmings are permitted to adhere to the heated knife for a prolonged period of time, they become at least partially vulcanized and thereafter cannot be readily reworked.

It will be apparent for the foregoing reasons as well as others which will be apparent to those skilled in the art that it is essential to remove all of the stock trimmings from the cutting edges and to keep the knives clean to avoid the production of defective articles and to reduce the cost of operation and upkeep of the equipment.

It is, therefore, an object of the present invention to effectively achieve the above-mentioned results.

To this end it is also an object of the present invention to provide a device for automatically maintaining the cutting edges of the knives in butt splicer equipment clean and free from deposits of the material being spliced.

It is a further object of the present invention to provide a device which is operable in the normal actuating cycle of the butt splicing apparatus to insure the removal of the trimmings from the heated knives employed in the apparatus immediately following the cutting operation.

Other important objects and advantages of the apparatus of the present invention will be apparent from the following description of one embodiment of the invention.

Figure 3:
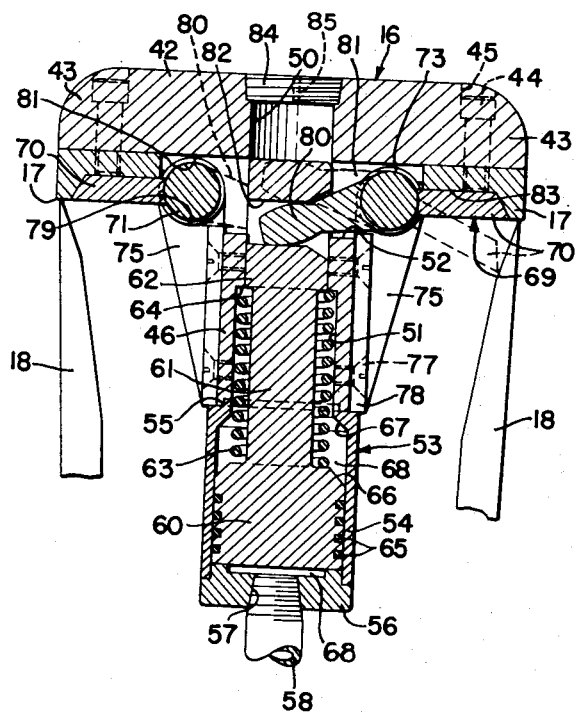

In the drawings, Fig. 1 is a side elevation with parts in section and broken away of a preferred form of a butt splicing apparatus with which the teachings of the present invention are particularly advantageously adapted to be employed, the cutting edges being shown in cutting position. Fig. 2 is a partial side elevation of a portion of the apparatus of Fig. 1 with parts broken away. Fig. 3 is a vertical section taken along the line 3—3 in Fig. 2 illustrating the anvil of the butt splicing apparatus of Fig. 1 with parts in elevation and broken away and showing one form of knife cleaning device and its operation.

Fig. 4 is a partial plan view of the knife cleaning device of Figs. 2 and 3.

Referring first to Fig. 1 of the drawings, the reference character 1 identifies the butt splicing apparatus generally. The butt splicing apparatus 1 has a pair of slide members or carriages 2 mounted for reciprocable movement in a horizontal plane along the ways 3 on the bed 4 of the frame member 5 of the apparatus. The ways 3 comprise a pair of parallel bars which are secured to the bed 4 as by means of a plurality of cap screws 6 threaded into suitable tapped holes provided in the frame member 5.

The butt splicing apparatus 1 embodies a pair of clamping means 7 for holding the ends of the tube stock 8 securely in position for the trimming and jamming steps of the splicing operation. The clamping means 7 comprises a guide member 9 which is mounted in a manner to be more fully explained hereinafter on the carriages 2 and the cooperating clamps 10. The clamps 10 are suspended from the vertical supports 11 which are arranged in such fashion that they may be actuated in both a vertical and a horizontal plane with respect to the bed 4 of the frame member 5 of the butt splicing apparatus 1.

The clamps 10 are secured to the vertical supports 11 by means of a depending flange portion 12 thereon which interfits with a bifurcated portion 13 on the clamps 10. A pin 14 extending through the bifurcated portion 13 of the clamp 10 and the depending flange portion 12 of the vertical support 11 serves to provide a tiltable mounting for each clamp in a direction transversely of the lateral dimension of the tube stock 8. A positioning member 15 is disposed adjacent the outermost end of each of the clamps 10 on the carriages 2. This positioning member 15 serves to prevent displacement of the clamp 10 in a direction longitudinally of the tube stock 8.

In certain of the operations of the butt splicing apparatus 1 it is necessary to provide an anvil 16 which is adapted to be positioned between the clamping means 7 for each of the ends of the tube stock 8 in the manner shown in Fig. 1. The anvil 16 provides the cutting surfaces 17 for coaction with the heated cutting edges or knives 18 in removing excess stock from the ends of the tube stock 8 to provide a tacky surface for joining the ends in the course of the splicing operation. A suitable actuating means (not shown) is provided for operating the support 19 for the anvil 16 to raise and lower it into and out of position with respect to the clamping means 7. A suitable means (not shown) is also provided for operating the actuating means 20 on which the knives 18 are mounted.

The guide 9 of each clamping means 7 is advantageously positioned and secured in place on the carriage 2 by means of a key portion 21 which fits into a groove 22 extending laterally of the carriage. The carriage 2 in each case has a stiffening rib 23 disposed directly beneath the position of the guide 9 thereon. This stiffening rib 23, together with a pair of locating ribs 24 arranged in parallel relation to each other are formed integrally with the underside of the carriage 2. The locating ribs 24 serve to cooperate with the ways 3 on the bed 4 of the frame member 5 in the butt splicing apparatus 1 to define a path of travel for the carriages 2 in a horizontal plane, toward and away from each other.

A boss portion 25 is formed on the underside of the carriage 2 and has a groove 26 machined thereacross to form a means of locating the hinge block 27 with the key portion 28 thereof fitted into the groove and fastened thereto. The hinge block 27 has a bifurcated end portion 29 which is adapted to receive a link 30 secured thereto as by means of a pin 31. The link 30 is similarly attached to an arm 32 as by means of a pin 33.

The arm 32 is fixed to a shaft 34 which is supported at each end by a bearing member 35 in a horizontal position extending substantially transversely of the carriage 2. The bearing members 35 are suitably secured to the web portion 36 of the frame member 5 in such fashion that the shaft 34 may be rotated about its longitudinal axis. The shaft 34 also has secured thereto an arm 37, the opposite end of which is fitted into the bifurcated member 38 to which it is secured by means of the pin 39 extending therethrough. The bifurcated member 38 is in turn mounted upon the free end of the piston rod 40 of a pneumatic cylinder 41.

The anvil 16 comprises a top member 42 of generally T-shaped cross section having horizontally projecting arms 43 to the under surface of which the cutting surfaces 17 are attached by means of a plurality of cap screws 44 arranged in spaced relation to each other and extending through the counter-bored holes 45 in the arms so as to engage suitably tapped holes in the cutting surfaces 17. Formed integrally with the top member 42 is a vertically extending rib 46 which is substantially coextensive with the top member and the horizontal arms 43 thereof.

At the opposite ends of the vertical rib 46 are disposed projecting key portions 47. Each key portion 47 engages a groove 48 in each of the supports 19 for the anvil 16. The supports 19 with the grooves 48 and the key portions 47 of the vertical rib 46 in engaging relation are secured to the top member 42 by means of a plurality of cap screws 49. The supports 19 operate to raise and lower the anvil 18 in accordance with a predetermined cycle of operations by a suitable actuating mechanism (not shown).

The top member 42 has a hole 50 drilled vertically through its central portion adjacent each end thereof and extending downwardly through the vertical rib 46 (see Figs. 2 and 3). A counter-bore 51 is provided at the lowermost end of each hole 50 and lateral openings 52 are formed through the walls of the vertical rib 46 so as to register with each of the holes 50. A pneumatic cylinder 53 is disposed at the lowermost end of the vertical rib 46 and in registration with the counter-bore 51 of each hole 50.

The pneumatic cylinder 53 in each case comprises a cylindrical shell 54 having a shoulder 55 thereon interfitting with a similarly shaped end on the lower surface of the vertical rib 46 at the base of the counter-bore 51. An end cap 56 closes the lowermost end of the cylindrical shell 54. The end cap 56 has a tapped hole 57 therein for attachment of the pipe 58 to the pneumatic cylinder 53. The pipe 58 forms a part of the piping system including the connection 59 from the pneumatic cylinder 41 previously described (see Fig. 1).

The pneumatic cylinder 53 has a piston 60 disposed internally of the cylindrical shell 54. The piston 60 has a stem portion 61 extending thereabove and incorporating an integrally formed bearing portion 62 which is slidably inserted in the hole 50 in the top member 42. A suitable biasing means in the form of a coiled compression spring 63 encircles the stem portion 61 of the piston 60 with one end bottoming against the upper surface of the piston and the other registering with a shoulder 64 formed at the end of the counter-bore 51 in the hole 50 opposite the end cap 56.

The compression spring 63 causes the piston to remain against the end cap 56 of the pneumatic cylinder 53 so long as there is no pressure being exerted against the bottom surface of the piston 60. Suitable annular seals 65 are provided on the piston 60. A tapered portion 66 is formed on the uppermost end of the piston 60 for registration with a similarly shaped seat 67 formed at the corresponding extremity of the cylindrical shell 54 internally of the chamber 68 of the pneumatic cylinder 53. This seat 67 defines the upper limit of motion of the piston 60 against the action of the compression spring 63.

It will be understood from Figs. 2 and 4 of the drawings that the anvil 16 is provided with identical assemblies at the opposite ends of the structure corresponding to that just described in detail.

The knife cleaning device 69, of which there is one for each knife 18, comprises a cleaning element or scraper bar 70 which is welded, brazed, or otherwise suitably secured to a rotatable mounting means or shaft 71. The shaft 71 is provided with end bearing portions 72 and intermediate bearing portions 73 which register with and are supported by the end bearing brackets 74 and the intermediate bearing brackets 75, respectively. The end bearing brackets 74 are suitably secured to the vertical rib 46 by means of a plurality of machine screws 76 which are counter-sunk therein. In a similar fashion, the intermediate bearing brackets 75 are secured to the vertical rib 46 by means of a plurality of machine screws 77 which are counter-sunk in the flange portions 78 of the bracket. Each of the bearing brackets 74 and 75 is provided with a cradle 79 (see Figs. 2 and 3) which closely conforms to the cylindrical surface of the end bearing portions 72 and the intermediate bearing portions 73, respectively, of the shaft 71.

The shaft 71 has integrally formed thereon a connecting member or rocker arm 80. When the shaft 71 is assembled in position with its end bearing portions 72 and intermediate bearing portion 73 mounted in the end bearing brackets 74 and the intermediate bearing brackets 75, respectively, so as to hold the shaft in place in the bearing portion 81 (see Fig. 3) formed on the under side of the arms 43 of the top member 42, the rocker arm 80 will extend through the opening 52 in the vertical rib 46 and register with the aperture 82 formed in the bearing portion 62 of the stem portion 61 of the piston 60 in the pneumatic cylinder 53. Whenever the knife cleaning device 69 is not operating, the scraper bar 70 thereof is confined in the recess 83 formed in the cutting surface 17 on the anvil 16. A suitable plug 84 is threaded into the uppermost end of the hole 50 in the top member 42 of the anvil 16.

The knife cleaning devices 69 for both knives 18 differ only in that the actuating mechanisms or cylinders 53, as we have seen, are disposed at opposite ends of the anvil 16. Thus, the rocker arms 80 will be located at opposite ends on the respective shafts 71, but both devices will be actuated simultaneously in a manner more fully described hereinafter.

At the beginning of the cycle of operation of the butt splicing apparatus 1, the clamps 10 of the clamping means 7 are raised above and spaced from their cooperating guides 9 on the carriages 2 of the apparatus. The anvil 16 is also positioned above the carriages 2 and located between the clamps 10 when the butt splicing apparatus 1 is prepared to begin its complete cycle of operations. With the parts of the butt splicing apparatus 1 in the arrangement described, that portion of the tube stock 8 intermediate the ends thereof is loosely draped over the supports 11 while the ends of the tube stock 8 are placed on the guides 9 so that they project slightly beyond the adjacent edges of the guides in the manner indicated in Fig. 1 of the drawings.

Next, the clamps 10 with the anvil 16 disposed therebetween are lowered into the position shown in Fig. 1 with the several members in contact with the tube stock 8 and with the clamps holding the material firmly in place against the top of the guides 9. The knife actuating means 20 on which the knives 18 are mounted are then energized to cause the latter to cut into and trim the strips 85 from the ends of the tube stock 8 while the ends are in contact with the cutting surfaces 17 of the anvil 16. Thereafter, the pneumatic cylinder 41 is caused to operate for an instant to move the clamping means 7 with the trimmed ends of the tube stock 8 firmly held in place on the guides 9 horizontally away from the anvil 16 a short distance.

This back-away movement of the clamping means 7 is sufficient to provide clearance for the anvil 16 and the knives 18 to be retracted downwardly by the action of the knife actuating means 20 and the supports 19 for the anvil. This withdrawal of the anvil 16 and knives 18 is thus accomplished without wiping against the freshly trimmed ends of the tube stock 8. The backaway motion mentioned above is achieved through the action of the pneumatic cylinders 41, one being provided for each side of the apparatus.

On actuation of the right hand pneumatic cylinder 41, the piston rod 40 is shifted downwardly in the direction of the arrow in Fig. 1. The piston rod 40 shifts the bifurcated member 38 secured to the shaft 34, causing the latter to rotate in a clockwise direction moving the arm 32 and the link 30 secured to the hinge block 27, thereby causing the right hand carriage 2 associated therewith to move toward the right as seen in Fig. 1. The corresponding left hand pneumatic cylinder 41 and its mechanism operates in the exact reverse of the right hand cylinder 41 and causes the carriage 2 associated therewith to move toward the left.

While this back-away motion of the carriage 2 is being accomplished, air under pressure from the pneumatic cylinders 41 passes through the connection 59 and pipe 58 to the chamber 68 of the pneumatic cylinder 53. This causes the piston 60 of the pneumatic cylinder 53 to move upwardly against the action of the compression spring 63 until the tapered portion 66 on the piston contacts the seat 67 at the uppermost end of the chamber 68. The aperture 82 of the bearing portion 62 on the stem portion 61 of piston 60 accommodating the rocker arm 80 is shifted vertically, rotating the shaft 71 about its bearing portions 72, 73 and causing the scraper bar 70 of the knife cleaning device 69 to move through an arcuate path toward the dotted line position shown in Fig. 3 of the drawings.

This swinging of the scraper bars 70 in the manner described above insures the immediate removal of any trimming which may adhere to the cutting edge of the knives 18. After the knife cleaning devices 69 have operated in the manner described, the air pressure in the chambers 68 of the pneumatic cylinders 53 from the cylinders 41 will diminish as the air is shifted in the latter during the operating cycle of the butt splicing apparatus 1. When this takes place, the spring 63 will eventually overcome the residual air pressure in the chamber 68, causing the piston to move downwardly.

The air in the cylinders 53 will gradually bleed out of the chambers 68 past the piston 60 through the aperture 85 in the plug 84 at the upper end of the hole 50 and the pistons will bottom against the end caps 56. With the bottoming of the pistons 60, the scraper bars 70 of the knife cleaning devices 69 will be restored to their original positions in the recesses 83 in the cutting surfaces 17 ready for the next cycle of operations.

While certain representative embodiments and details have been shown for the purpose of illustrating the invention, it will be apparent to those skilled in this art that various changes and modifications may be made therein without departing from the spirit or scope of the invention.

I claim:

1. In a butt splicing apparatus embodying a pair of clamping means for holding the ends of the material to be joined, a slide member cooperating with each clamping means for shiftable movement toward and away from each other, means for shifting the slide members, parallel cutting knives for trimming each of the ends of the material to be joined, and a cutting surface for each cutting knife, a device for removing the trimmings from the adjacent sides of the knives comprising means supported on each cutting surface and movable between the adjacent sides of the knives for removing the trimmings from the cutting knives; and means actuating the shifting means and the removing means substantially simultaneously and bringing the removing means into and out of contact with the cutting means.

2. In a butt splicing apparatus embodying a pair of clamping means for holding the ends of the material to be joined, a slide member cooperating with each clamping means for shiftable movement toward and away from each other, means for shifting the slide members, parallel cutting knives for trimming each of the ends of the material to be joined, and a cutting surface for each cutting knife, a device for removing the trimmings from the adjacent sides of the knives comprising a cleaning element for each cutting knife; means mounting the cleaning element on each cutting surface adjacent and movable between the cutting knives; and means operable according to a predetermined cycle causing each cleaning element to contact its cutting knife to remove the trimmings therefrom.

3. In a butt splicing apparatus embodying a pair of clamping means for holding the ends of the material to be joined, a slide member cooperating with each clamping means for shiftable movement toward and away from each other, means for shifting the slide members, parallel cutting knives for trimming each of the ends of the material to be joined, and a cutting surface for each cutting knife, a device for removing the trimmings from the adjacent sides of the knives comprising a cleaning element for each cutting knife; means swingably mounting the cleaning element on each cutting surface adjacent the cutting knives; actuating device for swinging each cleaning element toward and away from the adjacent sides of the cutting knives to remove the trimmings therefrom; and means operating the shifting means and the actuating devices substantially simultaneously.

4. In a butt splicing apparatus embodying a pair of clamping means for holding the ends of the material to be joined, a slide member cooperating with each clamping means for shiftable movement toward and away from each other, means for shifting the slide members, parallel cutting knives for trimming each of the ends of the material to be joined, and a cutting surface for each cutting knife, a device for removing the trimmings from the adjacent sides of the knives comprising a cleaning element for each cutting knife; means swingably mounting the cleaning element from each cutting surface adjacent the cutting knives; a fluid pressure device coacting with the swingable mounting for each cleaning element to cause the said cleaning element to move toward and away from the said side of its respective cutting knife and to remove the trimmings therefrom; and a fluid pressure supply source for substantially simultaneously operating each of the shifting means and each fluid pressure device.

5. In a butt splicing apparatus embodying a pair of clamping means for holding the ends of the material to be joined, a slide member cooperating with each clamping means for shiftable movement toward and away from each other, means for shifting the slide members, parallel cutting knives for trimming each of the ends of the material to be joined, and a cutting surface for each cutting means, a device for removing the trimmings from the adjacent sides of the knives comprising a cleaning element for each cutting knife; means swingably mounting the cleaning element on each cutting surface adjacent the cutting knives; a recess in each cutting surface for receiving the cleaning element; a fluid pressure device coacting with the swingable mounting for each cleaning element to cause the said cleaning element to move toward and away from the said side of its respective cutting knife and to remove the trimmings therefrom; and a fluid pressure supply source for substantially simultaneously operating each of the shifting means and each fluid pressure device.

6. Apparatus for the splicing of rubber comprising a clamp for holding each of the ends of the rubber to be spliced; carriages for moving the clamps toward and away from each other; parallel knives for trimming and heating the ends of the rubber to be joined; an anvil; cutting surfaces on the anvil for the knives; a drive mechanism for shifting the carriages; a cleaning device for removing the trimmings from the adjacent sides of the knives associated with and supported from the cutting surfaces; and means coacting with the drive mechanism for causing the cleaning devices to move between the knives for removing any trimmings from the adjacent sides of the knives.

7. Apparatus of the type defined in claim 6 in which the drive mechanism for each carriage comprises a rotatably mounted shaft; a linkage operatively connecting the shaft and the carriage; and a fluid pressure supply for actuating each shaft.

8. Apparatus of the type defined in claim 7 in which each cleaning device comprises a shaft swingably mounted on the cutting surface; a cleaning element on the shaft; and means for actuating the shaft.

9. Apparatus of the type defined in claim 8 in which the cleaning element comprises a scraper bar mounted on the shaft in such fashion that it fits into a recess formed in the cutting surface.

10. Apparatus of the type defined in claim 9 in which the means for actuating the shaft comprises a fluid pressure cylinder; and a rocker arm on the shaft operatively associated with the fluid pressure cylinder.

References Cited in the file of this patent

UNITED STATES PATENTS

| | | |
|---|---|---|
| 2,057,021 | Gammeter | Oct. 13, 1936 |
| 2,273,463 | Campbell et al. | Feb. 17, 1942 |
| 2,541,696 | George | Feb. 13, 1951 |
| 2,576,940 | Iknayan et al. | Dec. 4, 1951 |
| 2,676,641 | George | Apr. 27, 1954 |